United States Patent [19]

Speeter

[11] Patent Number: 5,838,921
[45] Date of Patent: Nov. 17, 1998

[54] DISTRIBUTED CONNECTION MANAGEMENT SYSTEM WITH REPLICATION

[75] Inventor: Thomas H. Speeter, San Ramon, Calif.

[73] Assignee: Silicon Graphics, Inc., Mountain View, Calif.

[21] Appl. No.: 569,056

[22] Filed: Dec. 8, 1995

[51] Int. Cl.[6] .................................................. G06F 15/16
[52] U.S. Cl. ............................. 395/200.57; 395/200.56
[58] Field of Search .................. 395/200.01, 200.05, 395/200.09, 200.03, 200.12, 684, 182.04, 200.56, 200.51, 200.57, 200.37; 370/401, 420, 85.13, 231

[56] References Cited

U.S. PATENT DOCUMENTS

| | | | |
|---|---|---|---|
| 5,263,625 | 11/1993 | Yasrebi | 370/85.13 |
| 5,317,568 | 5/1994 | Bixby et al. | 395/401 |
| 5,341,477 | 8/1994 | Pitkin et al. | 395/200.37 |
| 5,455,932 | 10/1995 | Major et al. | 395/182.04 |
| 5,461,611 | 10/1995 | Drake, Jr. et al. | 370/420 |
| 5,475,819 | 12/1995 | Miller et al. | 395/200.12 |
| 5,491,797 | 2/1996 | Thompson et al. | 395/200.03 |
| 5,561,769 | 10/1996 | Kumar et al. | 395/200.01 |
| 5,581,703 | 12/1996 | Baugher et al. | 395/200.12 |
| 5,633,999 | 5/1997 | Clowes et al. | 395/182.04 |
| 5,644,715 | 7/1997 | Baugher | 395/200.12 |
| 5,694,548 | 12/1997 | Baugher et al. | 370/231 |
| 5,701,465 | 12/1997 | Baugher et al. | 395/200.59 |

OTHER PUBLICATIONS

Farag et al., Structure Network Control of a Hierarchial Mobile Network Architecture, IEEE, pp. 671–677, Jan. 1995.

Klara Nahrstedt, et al., "The QOS Broker", *IEEE MultiMedia*, pp. 53–67, (Spring 1995).

Lixia Zhang, et al., "RSVP: A New Resource ReSerVation Protocol", *IEEE Network*, vol. 7, No. 5, pp. 8–18, (Sep. 1993).

Laurence A. Crutcher et al., "Connection Management for an ATM Network", *IEEE Network*, vol. 6, No. pp. 42–55, (Nov. 1992).

*Primary Examiner*—Richard L. Ellis
*Assistant Examiner*—Patrice L. Winder
*Attorney, Agent, or Firm*—Sterne, Kessler, Goldstein & Fox P.L.L.C.

[57] ABSTRACT

A distributed connection management system for an interactive multimedia network that controls the allocation and recovery of bandwidth resources in the network between client and server. The connection manager accepts as input the topology of a network to be controlled and partitions the local access portion of the network into separately administered neighborhoods. Resources for each of the partitioned neighborhoods are allocated by a replicated neighborhood connection manager. The remainder of the network is partitioned into the switched ATM network and into server network resources. Resources within the switched ATM network are administered by an ATM connection manager. Resources into and out of the servers are managed using a server connection manager. A connection within the network is achieved through the neighborhood connection manager by determining the other components of the connection manager needed to achieve the connection and combining the resources allocated by all three components of the connection manager and returning them to the client.

12 Claims, 5 Drawing Sheets

DISTRIBUTED CONNECTION MANAGEMENT SYSTEM WITH REPLICATION

BACKGROUND OF THE INVENTION

1. Field of the Invention

The present invention relates generally to the field of network communications, and more particularly, to a distributed connection management system for interactive multimedia networks.

2. Related Art

Communication networks allow end-users to connect to a wide range of information technology equipment through a shared medium for the exchange of information. Two types of information flow occurs on a network: user information and control information. User information includes text and image data as well as voice. Control information consists of information to establish a network connection as well as maintain a quality of service for that established connection. The latter is accomplished through the use of a connection management system, or a connection manager.

Connection management systems are needed for the delivery of real-time multimedia across computer and telecommunication networks. Connection management takes as input the topology of a network, and serves to allocate bandwidth as clients request access to the network.

Connection management systems to date have been centralized systems. This centralized architecture creates two basic problems. The first problem has to do with reliability and the single point of failure concept. Every connection that is allocated over the network must interface with the connection manager. If the hardware on which the connection manager is implemented goes down, the entire network is inoperable, even though 99% of the components in the network may still be operable. Further, if the connection manager goes down, the network is also inoperable. In the past, reliability has been addressed by the use of redundant hardware.

The second problem has to do with scalability and the ability of the connection manager to handle allocation requests as the client base grows. The number of clients attempting to access the network could cause the incursion of bottlenecks at the connection manager as the client base grows. This could result in the network being inoperable past a certain number of clients (e.g., one thousand).

SUMMARY OF THE INVENTION

The present invention is directed toward a distributed connection management system for wide area interactive multimedia networks. The present invention distributes the connection manager into multiple processes running on separate machines. The present invention takes advantage of the fact that wide area interactive multimedia networks are evolving toward a distributed client/server configuration. Connection management modules, controlling the allocation and recovery of bandwidth resources in a network, are particularly suited to this client/server configuration.

The present invention accepts as input the topology of an interactive multimedia network to be controlled, and divides the network into three types of components: (1) servers, (2) network, and (3) neighborhoods. Components of the connection manager are assigned to correspond to the components of the network. "Server connection managers" (SCMs) manage resources into and out of servers, as well as per-server setup of Internet Protocol (IP) level routing and Address Resolution Protocol (ARP) tables. Both IP and ARP are well established protocols to one skilled in the relevant art. Network connection managers manage network resources. For example, if the network is a switched ATM network, resources are administered by an "ATM connection manager" (ACM). The local access part of the network is partitioned into separately administered "neighborhoods." Each partitioned neighborhood has its resources allocated by a replicated "neighborhood connection manager" (NCM).

Generally, with conventional solutions the access network causes the incursion of bottlenecks at the connection manager as the client base increases. However, according to the present invention, the partitioning of the access network into neighborhoods and assigning each neighborhood a NCM provides an extremely scalable architecture in terms of its ability to handle allocation requests as the client base grows. Adding more neighborhoods to the system results in additional NCM components to handle additional clients. Each NCM component of the connection manager allocates resources for the corresponding partitioned neighborhood of the access network.

The present invention addresses the reliability problem by replicating each NCM. The replicated component of the NCM is referred to as a slave and the original component is referred to as a master. Every slave NCM knows exactly what the master NCM knows. The master always runs on a different machine (e.g., server) from the slave. Thus, if the server that the master NCM is running on fails or the master NCM itself fails, the client is still able to allocate bandwidth through the use of the slave NCM.

The distribution of functions among modules running on multiple servers provides an extreme level of fault tolerance and modularity in the connection management system. With the implementation of a replicated NCM, the connection management system can continue without loss of resources or the provision of service when server failure occurs. It further allows for network growth without the incursion of bottlenecks at the connection management system.

The method of establishing a connection includes the following steps. A client requests access to the network by invoking a library function call. The library function, in turn, determines which partition of the access network that client is in and calls the correct component of the connection management system. The correct component of the connection management system refers to the master/slave component of the particular NCM in which the client resides. Once the correct NCM has been accessed, it verifies the function call parameters (i.e., address, frequency, bandwidth) and determines the other two connection manager components needed to complete the connection. The NCM asks the ACM and the SCM for the resources for their portions of the network. The NCM then combines these resources with its own and returns them to the client via a library function.

BRIEF DESCRIPTION OF THE DRAWINGS

The present invention will be described with reference to the accompanying drawing, wherein.

DETAILED DESCRIPTION OF THE INVENTION

The preferred embodiment of the present invention is discussed in detail below. While specific configurations are discussed, it should be understood that this is done for illustration purposes only. A person skilled in the relevant art will recognize that other components and configurations may be used without parting from the spirit and scope of the invention.

The present invention is a distributed connection management system for an interactive multimedia network. Although the present invention is described in terms of a wide area network, the present invention is also applicable to local area networks as well as metropolitan area networks. The connection manager takes as input the topology of a network, and controls the allocation and recovery of bandwidth resources in a network. Distributed connection management software processes are provided throughout a network to handle the connection management for various components within a network. The present invention is described in this document in terms of an ATM switching network. After reading this description, it will be apparent to a person skilled in the relevant art how to implement the invention using other network types.

Figure 1:
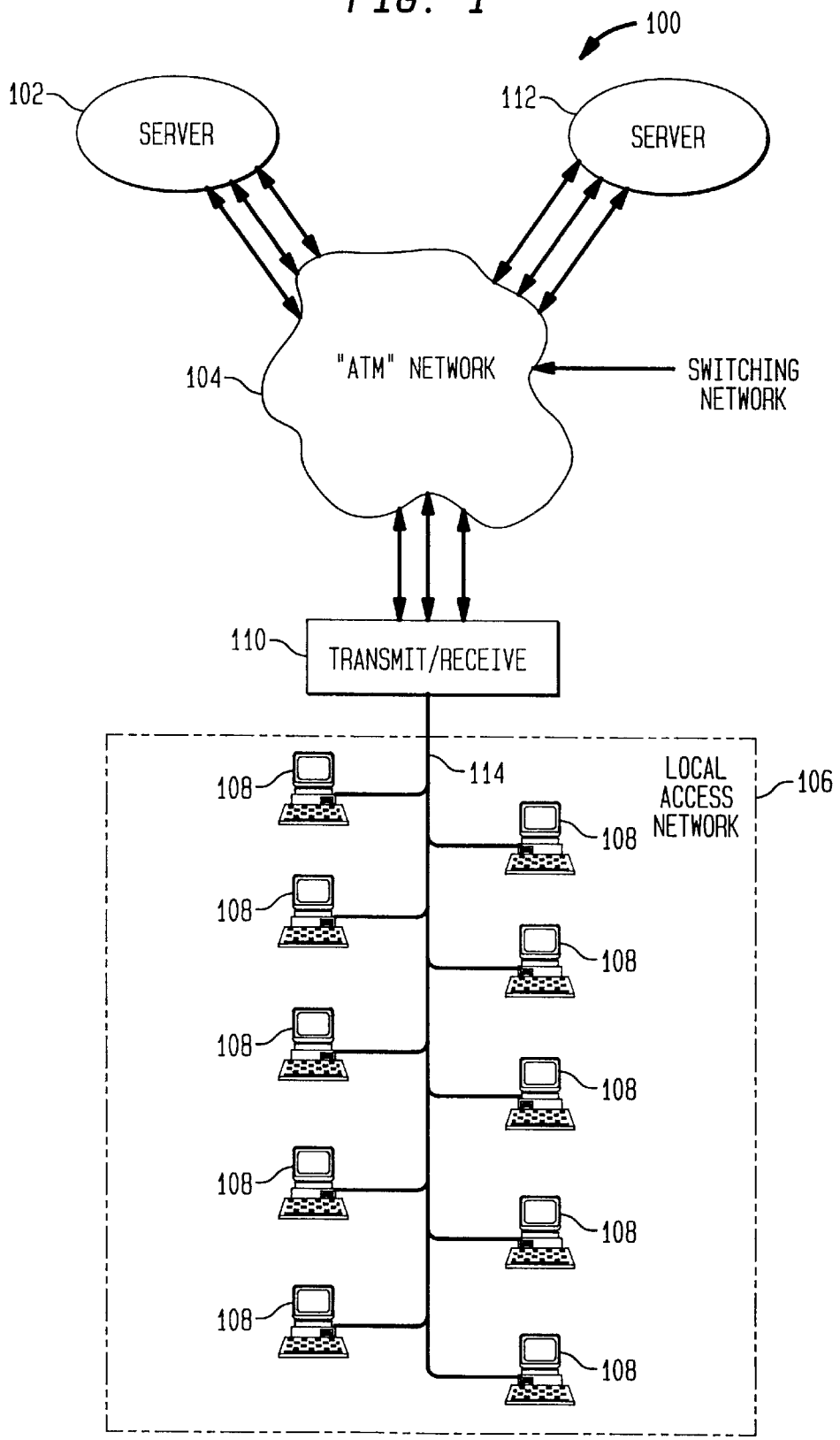
FIG. 1 illustrates an example of an interactive multimedia network and its component parts.

Prior to describing the invention in detail, a simplified description of an example wide area interactive multimedia network is provided. FIG. 1 is a block diagram illustrating a basic wide area interactive multimedia network 100. Wide area interactive multimedia network 100 comprises servers 102 and 112, an ATM switching network 104, a local access network 106, and a transmit/receive box 110. The role of servers 102 and 112 is to provide services to clients 108. Servers 102 and 112 are responsible for maintaining and managing information and answering client queries. ATM switching network 104 provides a means of transmitting data between clients 108 and servers 102 and 112. Local access network 106 is a means of concentrating a plurality of individual clients 108 onto a transmission media 114 such as twisted pair, co-axial cable, or optical fiber cable. All three transmission medias are well known to a person skilled in the relevant art. Transmit/receive box 110 is used to multiplex information from clients 108 onto switching network 104 and demultiplex information that is being sent from switching network 104 to clients 108.

The present invention is described in terms of the above example environment. Description in these terms is provided for convenience only. It is not intended that the invention be limited to application in this example environment. In fact, after reading the following description, it will become apparent to a person skilled in the relevant art how to implement the invention with other wide area interactive multimedia networks having different architectures, components, and levels of complexity.

A connection management system is needed for the delivery of real-time multimedia across computer and telecommunication networks. A connection management system is a software process that makes decisions on how to request quality of service (i.e., bandwidth resources) through a network. A connection manager takes as input the topology of a network and serves to allocate bandwidth as clients 108 request access to the network. The present invention distributes the connection manager into multiple processes running on multiple machines.

The present invention results in a more reliable, fault tolerant connection management system by dividing the network into its basic parts and assigning components of the connection manager to correspond to the components of the network. Server processes exporting Interface Definition Language (IDL) interfaces defined by the Common Object Request Broker Architecture (CORBA) standard offer an attractive model for the design of modular, fault tolerant connection management systems. IDL interfaces defined by the CORBA standard are well known to a person skilled in the relevant art.

Figure 2:
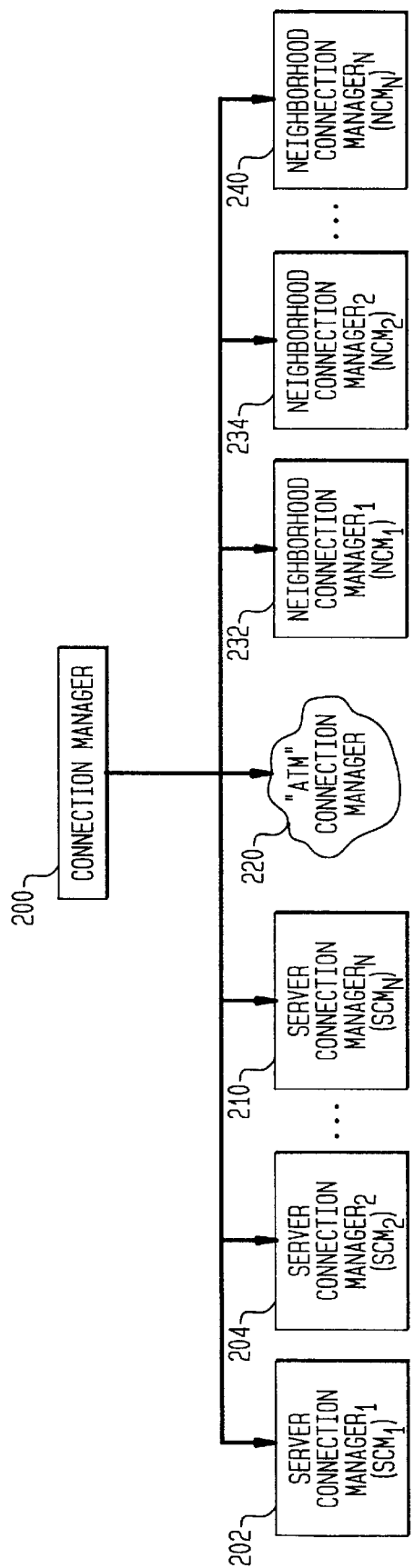
FIG. 2 illustrates the distributed components of a connection management system.

FIG. 2 illustrates a block diagram showing the modular distribution of the processes associated with the connection manager 200 according to one embodiment of the present invention. Connection manager 200 is divided into three separate processes: server connection managers (SCMs) 202, 204, ... 210, an "ATM" switching network connection manager (ACM) 220, and neighborhood connection managers (NCMs) 232, 234, ... 240. The local access portion of the network is divided into neighborhoods and each neighborhood is assigned its own NCM 232, 234, ... 240.

Figure 3:
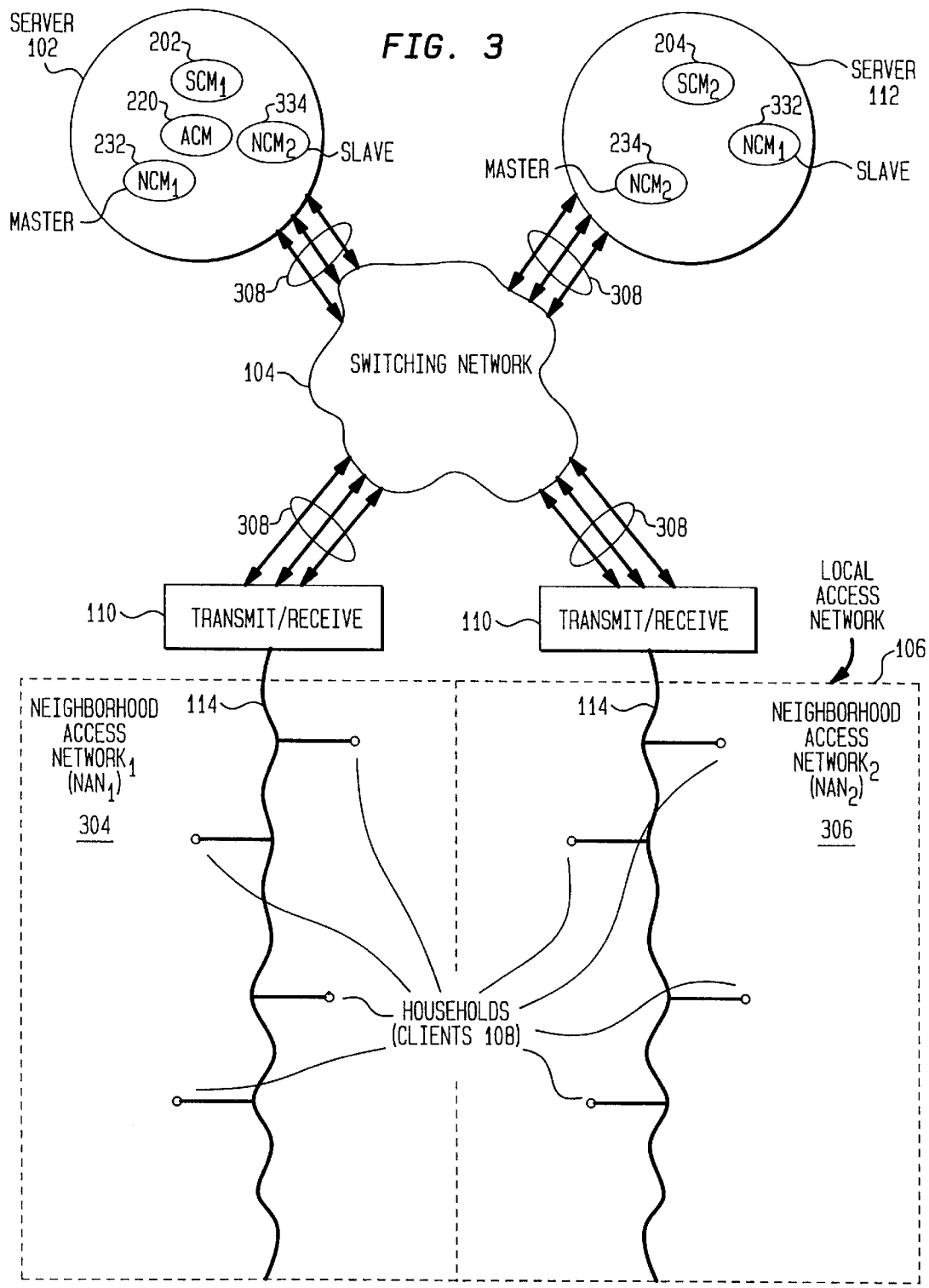
FIG. 3 illustrates an embodiment of a distributed connection management system for an interactive multimedia network.

FIG. 3 illustrates a preferred embodiment of the present invention using an interactive multimedia cable type network 300 with multiple households (i.e., clients 108) off of one single fiber 114. The network contains two servers 102 and 112, an "ATM" switching network 104, two transmit/receive boxes 110, and two neighborhoods 304 and 306. The first server 102 comprises a server connection manager ($SCM_1$) 202, a master neighborhood connection manager ($NCM_1$) 232, a slave connection manager ($NCM_2$) 334, and an ATM connection manager (ACM) 220. In this embodiment, only $SCM_1$ 202 is actually required to run on server 102. The other processes can run on any machine in the network, even if the machine is not a server. However, in a preferred embodiment corresponding master and slave components of a NCM are housed on separate machines to maintain reliability when server or process failure occurs. The second server 112 comprises a server connection manager ($SCM_2$) 204, a master connection manager ($NCM_2$) 234, and a slave connection manager ($NCM_1$) 332. Again, in this embodiment, $SCM_2$ 204 must run on server 112.

Both $SCM_1$ 202 and $SCM_2$ 204 allocate resources for their respective servers. $NCM_2$ 334 on server 102 is the replicated neighborhood connection manager for $NCM_2$ 234 on server 112. $NCM_1$ 332 on server 112 is the replicated neighborhood connection manager for $NCM_1$ 232 on server 102. If $NCM_1$ 232 were malfunctioning on server 102, or if server 102 were malfunctioning, bandwidth can still be allocated to client 108 using slave component $NCM_1$ 332 running on server 112. The same holds true for master $NCM_2$ 234 of server 112 and the slave $NCM_2$ 334 of server 102. The NCMs 232 and 234 allocate the local access resources for their respective neighborhoods and orchestrate the allocation of resources for the other components of the connection manager. The ACM 220 allocates the resources for the "ATM" switching network 104.

The local access network 106 of FIG. 3 is divided into two neighborhoods or neighborhood access networks 304 and 306. Clients 108 in each neighborhood are represented as households. Every client 108 in a neighborhood 304 or 306 uses the same neighborhood connection manager $NCM_1$ 232 or $NCM_2$ 234, respectively. Therefore, the number of clients 108 capable of being serviced in neighborhoods 304 and 306 is always known. When the client base in neighborhoods 304 and 306 grows beyond what NCM 232 and 234 can handle, a new neighborhood and its associated NCM are implemented. The new NCMs are established offline in a database, but also could be established dynamically. When the client computer 108 boots, it is told what partition of the network it is in via a library function.

Information and data are transported across the network using cables 308. The present invention can be implemented on hybrid fiber-coax network, fiber to the home networks, enterprise wide corporate multimedia networks, or using other like connections.

The architecture of connection manager 200 as a distributed set of processes is transparent to clients 108 in a library function. When clients 108 want to allocate resources through network 300, an address and a port number are needed. This is provided to clients 108 by calling a library function. The library function, in turn, determines which neighborhood 304 or 306 of access network 106 client 108 resides in and accesses the correct component of connection manager 200. Again, this is all transparent to clients 108 in the library code. From this point on, every connection is composed of three parts: the server part, the switching network part, and the local access network part.

Figure 4:
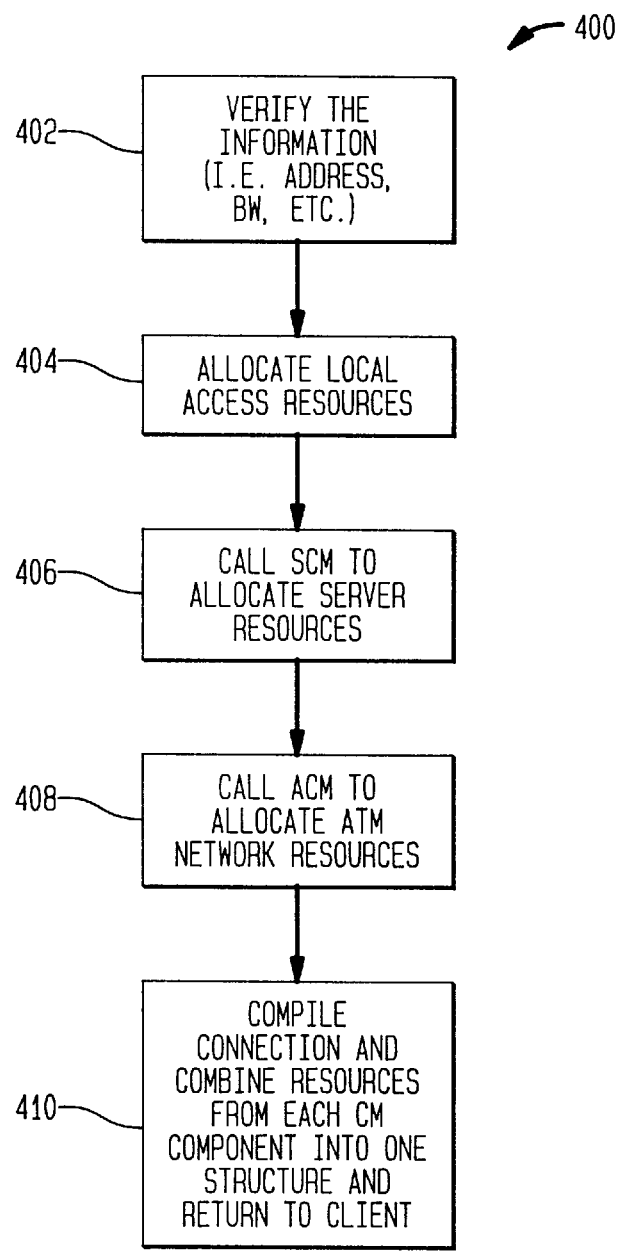
FIG. 4 illustrates a flow diagram of the method of establishing a connection using the present invention.

The functionality of NCM 232, 234, . . . , and 240 will now be described with reference to the flow diagram illustrated in FIG. 4. NCM 232, 234, . . . , and 240 orchestrate the allocation of resources from all three components of connection manager 200. The particular NCM (i.e., NCM 232 or 234 in the present embodiment) determines the path needed from server 102 or 112 through the switching network 104 to the local access network 106 and asks the remaining distributed connection manager components, SCMs 202,204, . . . or 210 and ACM 220, of network 300 for the resources for their respective portions of the network in order to complete the desired connection.

The process begins with verification step 402. Step 402 verifies that the quality of service parameters, i.e., address, bandwidth, frequency, etc., are valid data. The next three steps 404, 406, and 408 can be executed in any order and can be executed as remote, distributed processes or within a single process or any combination thereof. For illustrative purposes, steps 404, 406, and 408 will be explained in the order shown in FIG. 4. At each step (404, 406, and 408), a pool of resources are managed and allocated to meet the quality of service requested. Load balancing algorithms such as load balancing on network links or on network interfaces can be implemented at any one of steps 404, 406, and 408 to manage and allocate the pool of resources. Such algorithms are well known to a person skilled in the relevant art.

Step 404 allocates local access resources. NCM 232, 234, . . . , and 240 are responsible for allocating all resources downstream of the ATM network. These resources can include frequency, bandwidth, addresses, etc.

Step 406 represents the allocation of server resources. NCM 232, 234, . . . , and 240 accomplish this by making a remote procedure call (RPC) to the appropriate server connection manager 202, 204, . . . , or 210. Server connection manager 202, 204, . . . , or 210, in turn, allocates enough resources to meet the quality of service from server 102 or 112 to the ATM network 104.

Resources for the ATM portion of the network 104 are obtained using step 404 or step 408. ATM resources can be allocated in one of two ways. The resources for the ATM network 104 can be implemented within NCM 232, 234, . . . , and 240 and, therefore, would be handled under step 404 or it can be implemented using ACM 220 running on any of the machines on network 300 and may, in fact, be a signaling protocol such as Q2931 or RSVP. Q2931 and RSVP are standard signaling protocols for signaling into wide area networks and local area networks, respectively, that are well known to a person skilled in the relevant art. If resources for the ATM network are implemented using ACM 220, step 408 handles this process.

Final step 410 comprises compiling the connection and returning it to client 108. NCM 232, 234, . . . , or 240 takes the resources allocated by server 102 or 112, ATM network 104, and local access network 106 and combines them into one structure to pass to client 108, via the library, to complete the connection.

Figure 5:
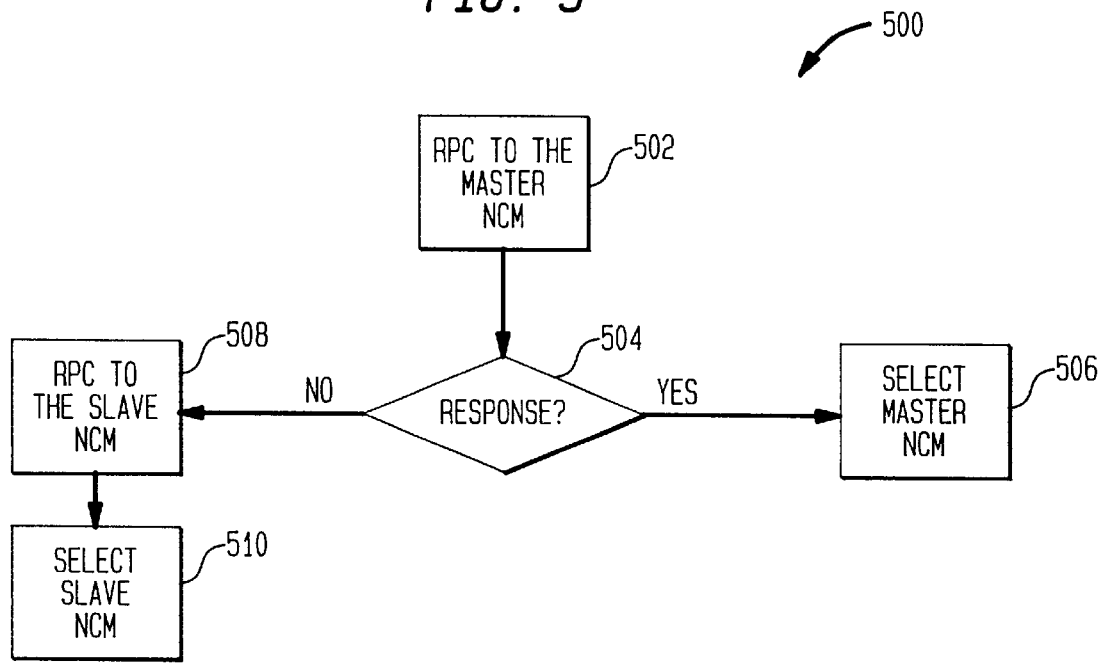
FIG. 5 illustrates a flow diagram for determining which neighborhood connection manager component to utilize in accordance with the present invention.

The library code is housed on the client 108 computer. Inside the library code, reference is made to a master and a slave NCM for that particular partition of the network. FIG. 5 illustrates a flow diagram 500 showing the steps used by the library code in a preferred embodiment to determine whether the master component or the slave component of the NCM is to be accessed. Once the library determines what neighborhood the client resides in, it decides whether to use the master component or the slave component of the NCM. In step 502, the library makes a remote procedure call to the master component of the NCM. Step 504 waits for the master component of the NCM to respond. If the master component responds, step 506 accesses the master component of the NCM. If the master component is unresponsive, step 508 causes a remote procedure call to be made to the slave component of the NCM. Step 510 accesses the slave component of the NCM.

While other embodiments of the present invention are possible, such as the implementation of the master/slave architecture with databases, the breadth and scope of the present invention should not be limited by any of the above-described embodiments, but should be defined only in accordance with the following claims and their equivalents.

What is claimed is:

1. A distributed connection management system for an interactive multimedia network, the network comprising servers, one or more switching networks, and one or more local access networks having one or more neighborhoods, the system comprising:

a server connection manager for each server in the network to allocate and recover bandwidth resources between the server and the switching network;

a network connection manager for the switching network to allocate and recover bandwidth resources for the switching network;

a neighborhood connection manager for each neighborhood in the local access networks to allocate and recover bandwidth resources for the neighborhood, to determine a switching connection manager and said server connection manager needed to complete the connection, and to combine resources from said connection manager components to establish a network connection, said neighborhood connection manager comprising a master component and a slave component, wherein said slave component is a replication of said master component, and said slave component is accessed when said master component is unresponsive; and means for requesting a connection across the network.

2. The system of claim 1, wherein said slave component is housed separately from said master component.

3. The system of claim 2, wherein said slave component is an identical process to said master component.

4. The system of claim 1, wherein said switching connection manager is implemented within said neighborhood connection manager.

5. The system of claim 1, wherein said means for requesting a connection is a library function call from a client computer.

6. The system of claim 5, wherein said client computer is identified as belonging to said neighborhood partition at boot-up.

7. The system of claim 1, wherein said network is an ATM switching network and said network connection manager is an ATM connection manager.

8. A method of establishing a connection across a network by allocating bandwidth, the method comprising the steps of:

making a library function call to a library to determine a neighborhood where a client resides within an access network, comprising the steps of:

determining whether to access one of a master neighborhood connection manager and a slave neighborhood connection manager, wherein said slave neighborhood connection manager is a replication of said master neighborhood connection manager; and accessing one of said master neighborhood connection manager and said slave neighborhood connection manager;

verifying quality of service parameters;

allocating bandwidth resources for a local access portion of said network and the network portion of said network;

allocating bandwidth resources for a server portion of said network by calling a server connection manager; and compiling a connection and returning it to the client through said library.

9. The method of claim 8, wherein the step of allocating bandwidth resources for the network portion of said network further comprises calling an ATM connection manager.

10. The method of claim 9, wherein the step of compiling a connection further comprises:

combining the allocated bandwidth resources from said neighborhood connection manager, said ATM connection manager, and said server connection manager into one structure; and passing said structure back to said client through said library code.

11. The method of claim 8, wherein the step of compiling a connection further comprises:

combining the allocated bandwidth resources from said neighborhood connection manager and said server connection manager into one structure; and passing said structure back to said client through said library code.

12. The method of claim 8, wherein said step for determining whether to access one of said master neighborhood connection manager and said slave neighborhood connection manager comprises the steps of:

making a remote procedure call to said master neighborhood connection manager;

determining whether said master neighborhood connection manager is responsive; and selecting said master neighborhood connection manager if it is responsive, otherwise, selecting said slave connection manager.

\* \* \* \* \*